United States Patent [19]

Michael et al.

[11] Patent Number: 4,912,068

[45] Date of Patent: Mar. 27, 1990

[54] MAGNESITE-CARBON REFRACTORIES

[75] Inventors: David J. Michael, White Oak; David A. Kirk; Leigh F. Brooks, both of Pittsburgh, all of Pa.

[73] Assignee: Dresser Industries, Inc., Dallas, Tex.

[21] Appl. No.: 274,387

[22] Filed: Nov. 21, 1988

[51] Int. Cl.⁴ .................. C04B 35/54; C04B 35/04
[52] U.S. Cl. ................... 501/101; 266/280; 266/286
[58] Field of Search ............... 501/101; 266/280, 286

[56] References Cited

U.S. PATENT DOCUMENTS

| | | | |
|---|---|---|---|
| 641,551 | 1/1900 | Rothberg | 501/119 |
| 976,996 | 11/1910 | Fludder et al. | 501/119 |
| 1,365,336 | 1/1921 | Mollen et al. | 501/113 |
| 2,062,962 | 12/1936 | Baumann et al. | 49/79 |
| 2,314,107 | 3/1943 | Shardlow et al. | 106/62 |
| 2,354,757 | 8/1944 | Kleinschmidt et al. | 106/62 |
| 2,516,249 | 7/1950 | Osborn | 106/60 |
| 3,082,104 | 3/1963 | Belz | 106/58 |
| 3,086,876 | 4/1963 | Griggs et al. | 106/61 |
| 3,220,860 | 11/1965 | Gordon et al. | 106/44 |
| 3,322,551 | 5/1967 | Bowman | 106/58 |
| 4,306,030 | 12/1981 | Watanabe et al. | 501/99 |
| 4,431,745 | 2/1984 | Watanabe et al. | 501/101 |
| 4,454,239 | 6/1984 | Cassens, Jr. | 501/99 |
| 4,557,884 | 12/1985 | Petrak et al. | 264/64 |
| 4,574,119 | 3/1986 | Perry et al. | 501/114 |

OTHER PUBLICATIONS

*Talkabutsu Overseas*, vol. 3, No. 4, pp. 3 to 13, no date.
*Talkabutsu Overseas*, vol. 6, No. 1, pp. 11 to 15, no date.

Primary Examiner—Mark L. Bell
Assistant Examiner—Deborah Jones
Attorney, Agent, or Firm—Sigalos, Levine & Montgomery

[57] ABSTRACT

A mix for forming a carbon-bonded refractory shape comprising from about 70 to 92 wt. % of a high purity magnesite and about 8 to 30 wt. % of a high purity graphite, and for each 100 wt. % of said magnesite and graphite, from about 1.5 to 6 wt. % of a carbon-containing bonding agent; said graphite containing at least about 98% carbon and having at least about 75% by weight −65 mesh or finer particles and said magnesite containing at least about 98% MgO, and containing less than about 0.03% boron oxide, less than about 0.3% silica, and having a $CaO/SiO_2$ weight ratio above about 2, and the resultant carbon-bonded refractory shape and liner for basic oxygen furnaces made from such shapes and the method of increasing the life of liners for basic oxygen furnaces.

16 Claims, 2 Drawing Sheets

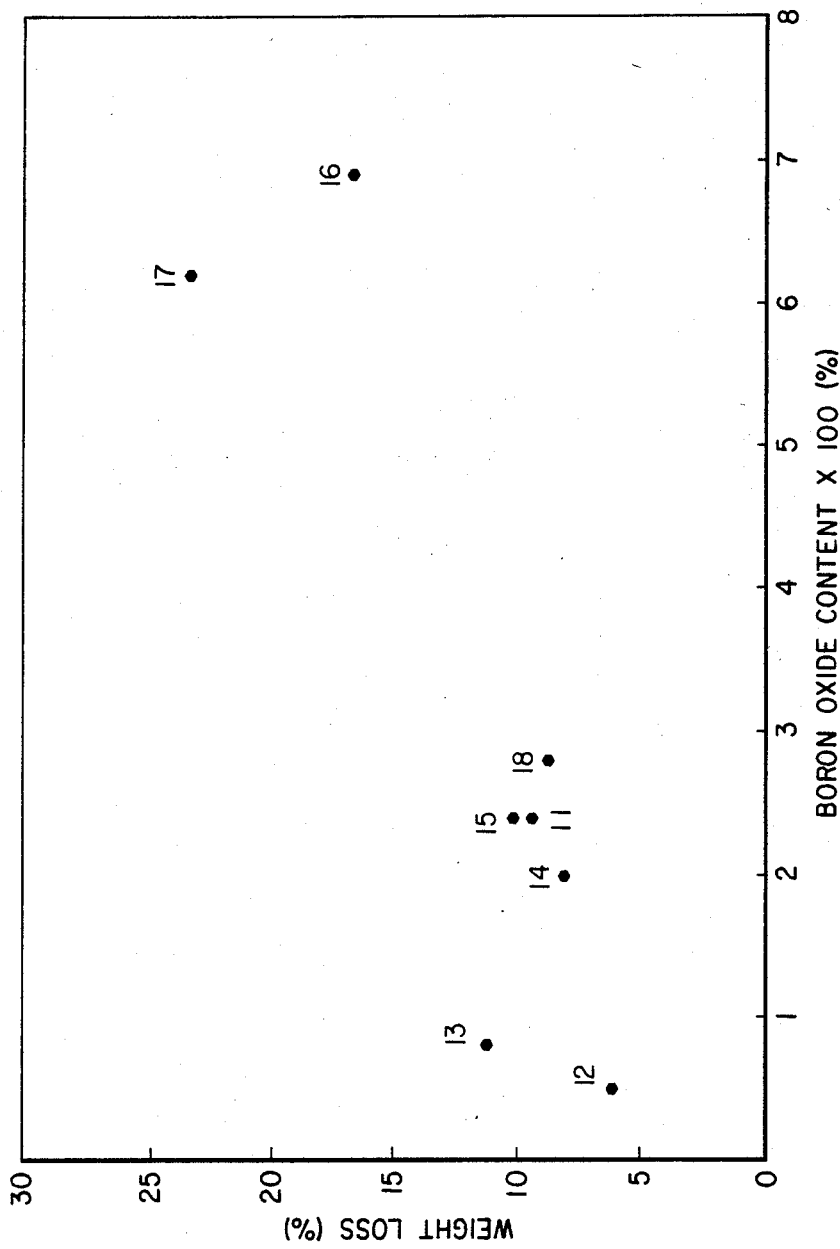

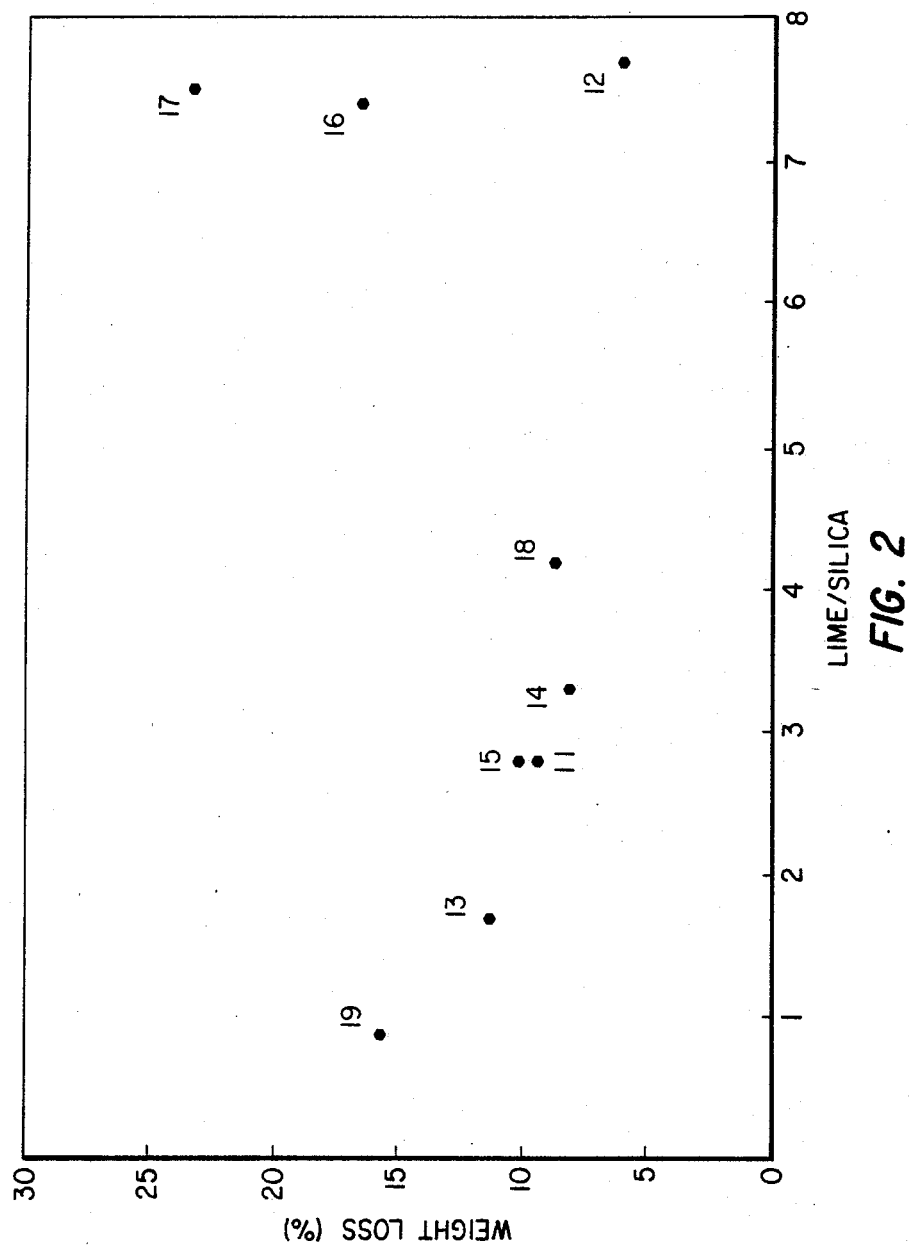

MAGNESITE-CARBON REFRACTORIES

BACKGROUND OF THE INVENTION

The present invention relates to carbon-containing refractories and in particular magnesite-carbon refractory brick suitable for use in metal processing equipment, especially basic oxygen furnaces where high hot strength and high slag resistance of refractory linings are required.

Carbon-containing basic refractory brick have been used in basic oxygen furnaces for many years. In the U.S.A., for example, pitch bonded and burned pitch impregnated magnesite brick have been used since the early 1960's. In other areas of the world, different practices have been used. For instance, pitch bonded and burned pitch impregnated dolomite brick have been used in Europe. In Japan, burned pitch impregnated basic brick with relatively high levels of lime (e.g. 30% CaO and 70% MgO) have been used.

In the late 1970's and early 1980's, a major advance in the technology of BOF refractories was realized with the introduction of magnesite-carbon brick. Unlike the brick that had traditionally been used, this brick contained graphite. Flake graphite was used most often, although in some cases Sri Lankan vein graphite was employed. These magnesite-carbon brick generally had high carbon contents ranging from about 8 to 30%, while the traditional brick contained a maximum of 5% carbon as a rule.

While use of the magnesite-carbon brick in basic oxygen furnaces did result in longer times between furnace relines, it was perceived in early trials that the performance of these brick could be improved by increasing their hot strength and oxidation resistance. As a result, magnesite-carbon brick that contained powdered metals were developed. These brick have been described in U.S. Pat. No. 4,306,030. The metals used in these brick were aluminum, silicon and magnesium. The metals increased oxidation resistance by lowering the permeability of the brick and by consuming oxygen that would otherwise have oxidized carbon. The term "magnesite-carbon brick" as generally used in this industry, and as used herein, refers to brick that contain graphite in combination with deadburned magnesite or magnesia, with the brick containing in excess of 8% by weight carbon.

While the introduction of metal-containing brick represented a significant improvement in BOF refractory technology, it has now become apparent that additional improvements are necessary.

SUMMARY OF THE INVENTION

It is the object of this invention to provide an improved brick to replace metal-containing magnesite-carbon brick in basic oxygen furnaces. These improved brick are more refractory and less subject to slag attack than the metal-containing brick.

Briefly, the present invention comprises a mix for forming a metal-free refractory comprising from about 70 to 92 wt. % of a high purity magnesite and, correspondingly, about 8 to 30 wt. % of a high purity graphite, and for each 100 wt. % of said magnesite and graphite from about 1.5 to 6 wt. % of a carbonaceous bonding agent; said magnesite containing at least about 98% MgO, and preferably less than about 0.03% boron oxide, less than about 0.3% silica, and a $CaO/SiO_2$ weight ratio above about 2, and said graphite containing at least about 98% carbon as measured by loss on ignition (LOI). The invention also comprises the resultant refractory shapes and particularly brick and liners for basic oxygen furnaces having an increased life using said brick as hereinafter set forth.

BRIEF DESCRIPTION OF THE DRAWINGS

FIG. 1 is a graph depicting the effect of boron oxide content of the magnesite, and FIG. 2 is a graph depicting the effect of the $CaO/SiO_2$ ratio of the magnesite.

DETAILED DESCRIPTION

The essential elements of the instant invention are the high purity magnesite and the high purity graphite. It is essential that both have the purities discussed below.

With the magnesite, it is necessary that it contain at least about 98% MgO and contain less than about 0.03% boron oxide, less than about 0.3% silica, and have a $CaO/SiO_2$ weight ratio above about 2. As to the graphite, it should have a loss on ignition (LOI) of 98% carbon or greater and a particle size of −65 mesh or finer for at least about 75% by weight of the graphite used; preferably about 95% by weight. It is preferred to utilize flake graphite or a vein graphite such as Sri Lankan graphite fines.

With respect to the purity of the materials, this is essential since it is necessary to minimize the amount of boron and silica present in the mix because of its effect on the resultant product. The low boron content is required in order to enable the magnesite grain to be stable in the presence of carbon at high temperatures; particularly the high temperatures present in basic oxygen furnaces.

While not completely understood, it is believed that the increased thermal stability of the brick of the present invention is due also to the fact that there is a limited amount of silica which can react with the carbon to form SiO gas and CO gas which vaporize and weaken the resultant brick.

The noted $CaO/SiO_2$ ratio is also critical in ensuring the stability of the magnesite grains in the presence of carbon at high temperatures.

With respect to the proportions of materials, there should be utilized from about 70 to 92 wt. % of the high purity magnesite as defined above and, correspondingly, about 8 to 30 wt. % of the high purity graphite.

The particle size or the graded size of the magnesite is not critical; it should be that conventionally used in making this type of brick.

Also, with respect to the graphite, it must have a particle size noted above. Although it is known that the oxidation resistance of graphite decreases as graphite gets finer and that the thermal conductivity of magnesite-carbon brick decreases as the particle size of the graphite decreases, it has surprisingly been found that the increased purity of the graphite and its combination with the high purity magnesite overcomes these prior problems to give brick of increased thermal stability.

Also included in the mix must be a carbonaceous bonding agents that yields high levels of carbon on pyrolysis; i.e. over about 25% by weight carbon. Examples are any novolak or resol resin, tar, pitch or mixtures thereof, and the like conventionally used for bonding brick. At the temperatures at which these brick are used, these materials are decomposed and the carbon derived acts to bind the brick. The amounts thereof are not critical but it is desired to avoid high binder levels in order to avoid difficulties in brick formation during processing. Ordinarily about 1.5 to 6% by weight; preferably 2.5 to 4%, of such bonding agent is added for each 100% by weight of the mix.

The method of forming the brick is not critical in that the components noted above can simply be admixed, pressed into shape in the usual brick-making presses, and then baked at the conventional temperatures; i.e., about 250° to 550° F. to form the unburned brick which are then used as noted above, particularly as linings for basic oxygen furnaces. In the use, the bricks become burned at high temperatures in such furnaces to form carbon-bonded brick of high hot strength and improved slag resistance. The brick of the present invention are particularly suitable as linings for basic oxygen furnaces where their increased hot strength, slag resistance, and stability at high temperatures results in longer times between furnace relines.

The brick of the present invention are made to the size and shape required to form the entire lining or portions of linings of any shape of basic oxygen furnace. The linings are formed in the conventional manner by forming courses, or rings, of the proper size brick about the interior of the furnace. Other construction techniques are also commonly used and, of course, in areas where brick cannot be used, refractory ramming mixes are utilized.

The invention will be further described in connection with the following examples which are set forth for purposes of illustration only.

EXAMPLES 1 TO 3

It was known that aluminum in magnesite-carbon brick will oxidize during service in basic oxygen furnaces by several mechanisms:
(1) Reaction with atmospheric oxygen;
(2) Reaction with highly reducible oxides in the slag such as $FeO$ and $SiO_2$; and/or
(3) Reaction with easily reducible oxides in the brick such as $SiO_2$ and $FeO$.

In basic oxygen furnaces, oxidation of aluminum by reaction mechanism (1) is considered to be of least importance because the furnace atmosphere is highly reducing during each heat and between heats the brick are coated with slag, preventing direct contact between the brick and the atmosphere. Oxidation of aluminum by mechanisms (2) and (3) is more prevalent in basic oxygen furnaces.

There was concern that the oxidized aluminum (alumina) would form low melting phases by reaction with the silicate minerals of high lime-to-silica ratio that are contained in the magnesite grain used in magnesite-carbon brick. Although formation of these low melting alumina-silica-lime phases is a well-known phenomenon in burned magnesite brick, it was not obvious that such phases would form in magnesite-carbon brick because the carbon in the brick would inhibit reaction between the alumina and the magnesite grain.

Examples 1, 2 and 3, listed in Table I, were made to determine if alumina additions would lower the refractoriness of a magnesite-carbon brick, as measured by hot strength. Three mixes were formed and brick made therefrom by pressing the mix in a conventional press at 18,000 psi with pauses at 2500 and 7500 psi, and the brick cured with a baking schedule of 100° F./hr to 350° F. with a 3-hour hold, and the brick were tested. The results are set forth in Table I below.

TABLE I

| | Example Number | | |
|---|---|---|---|
| | 1 | 2 | 3 |
| Mix: | | | |
| Magnesite | 83% | 81.5% | 80% |
| Flake Graphite | 17 | 17 | 17 |
| Alumina Powder | 0 | 1.5 | 3 |
| Plus Addition: | | | |
| Phenolic Resin Binder | 3.5 | 3.5 | 3.5 |
| Bulk Density, pcf: | 184 | 184 | 185 |
| Porosity Data (After Coking at 2000° F.) | | | |
| Bulk Density, Pcf: | 179 | 177 | 177 |
| Apparent Porosity, %: | 10.0 | 10.4 | 10.5 |
| Apparent Specific Gravity: | 3.18 | 3.17 | 3.16 |
| Crushing Strength at 2800° F., psi: | 2550 | 1900 | 2080 |

As the data in Table I indicate, there was a decrease in the crushing strength at 2800° F. when alumina was added to the magnesite-carbon brick.

These examples are comparative in that they illustrate the decrease in refractoriness of magnesite-carbon brick with alumina additions, as measured by hot strength. These results indicated that alumina formed from oxidation of aluminum in service would decrease the refractoriness of an aluminum-containing magnesite-carbon brick.

Another reason for not wanting to have aluminum metal in a magnesite-carbon brick is that it can increase the rate of slag attack on the brick. It is well known that alumina acts as a slag fluidizer with the limey slags that are used in basic oxygen furnaces. Thus, at the hot face of an aluminum-containing magnesite-carbon brick where the slag constituents have oxidized the aluminum metal, the slag will be more fluid, causing a greater amount of erosion than would have occurred had the aluminum not been present.

EXAMPLES 4 TO 7

The examples are comparative in that they show the decrease in hot crushing strength with silicon addition. In magnesite-carbon brick that contains silicon, the silicon would oxidize in service in a BOF by mechanisms similar to those that cause aluminum to oxidize. The silica that would result from such oxidation is a contaminant in basic refractory systems and can lower refractoriness. In addition, silica is not very stable in the presence of carbon and can be reduced, resulting in a loss of carbon from the brick at high temperatures. The data in Table II show the damaging effect of adding silicon to magnesite-carbon brick, as illustrated by the decrease in the hot crushing strength associated with the silicon additions. The brick were formed as in Examples 1 to 3.

TABLE II

| | Example Number | | | |
|---|---|---|---|---|
| | 4 | 5 | 6 | 7 |
| Mix (in wt. %): | | | | |
| Magnesite | 83% | 82 | 81% | 80% |
| Flake Graphite | 17 | 17 | 17 | 17 |
| Powdered Silicon | 0 | 1 | 2 | 3 |
| Plus Addition: | | | | |
| Phenolic Resin Bond | 3.5 | 3.5 | 3.5 | 3.5 |
| Bulk Density, pcf: | 181 | 181 | 180 | 178 |
| Porosity Data (After Coking at 2000° F.) | | | | |
| Bulk Density, Pcf: | 177 | 178 | 177 | 177 |
| Apparent Porosity, %: | 11.2 | 10.3 | 10.5 | 10.5 |
| Apparent Specific Gravity: | 3.19 | 3.17 | 3.17 | 3.16 |

TABLE II-continued

| | Example Number | | | |
|---|---|---|---|---|
| | 4 | 5 | 6 | 7 |
| Crushing Strength at 2800° F., psi: | 2410 | 2040 | 1530 | 1490 |

Unlike oxidized aluminum and silicon, oxidized magnesium is not chemically detrimental to magnesite-carbon brick. However, magnesium easily vaporizes as the magnesite-carbon brick are heated, resulting in brick with porous textures. Porous textures reduce the slag resistance of the brick. Even if the magnesium reacts with the carbon in the brick to form magnesium carbides, the magnesium easily volatilizes from the brick during heating because the carbides themselves are not stable and decompose according to the following equations:

$$2MgC_2 \xrightarrow{1112° F.} Mg_2C_3 + C$$

$$Mg_2C_3 \xrightarrow{1380° F.} 2Mg_{(gas)}3C$$

This evidence led to the conclusion in applications like the BOF where the principal mode of wear was not oxidation by the furnace atmosphere, but was rather principally due to slag attack with mechanical abuse sometimes playing a role, the addition of powdered aluminum, silicon and/or magnesium would increase the rate of wear of the magnesite-carbon brick. Thus, it was necessary to develop magnesite-carbon brick that contained no powdered metals in order to maximize slag resistance, but at the same time retaining enough hot strength to withstand mechanical abuse that the brick might encounter in service.

EXAMPLES 8 to 10

With the above goal in mind, a series of three tests were run to examine the effect of graphite purity and particle size on the crushing strength at 2800° F. The particulars of the mixes used (the brick were formed as in Examples 1 to 3) and the test results are set forth in Table III.

The 99% LOI and 96.5% LOI graphites had the following screen analyses (Tyler mesh sizes):

| Mesh Size | 99% | 96.5% |
|---|---|---|
| −10 +28 | 0-Trace | 0-1% |
| −28 +65 | 0-3% | 27-52% |
| −65 | 97-100% | 48-73% |
| −150 | 53-79% | 15-36% |
| −325 | 7-10% | 2-6% |

TABLE III

| | Example Number | | |
|---|---|---|---|
| | 8 | 9 | 10 |
| Mix (in wt. %): | | | |
| Magnesite | 83% | 83% | 80% |
| Flake Graphite (99% LOI) | — | 17 | — |
| Flake Graphite (96.5% LOI) | 17 | — | 17 |
| Powdered Aluminum | — | — | 3 |
| Plus Addition: | | | |
| Phenolic Resin Bond | 3.5 | 3.5 | 3.5 |
| Bulk Density, pcf: | 184 | 184 | 184 |
| Porosity Data (After Coking at 2000° F.) | | | |
| Bulk Density, Pcf: | 180 | 179 | 176 |
| Apparent Porosity, %: | 9.2 | 9.4 | 9.5 |
| Apparent Specific Gravity: | 3.17 | 3.16 | 3.12 |
| Crushing Strength at 2800° F., psi: | 2140 | 3290 | 4700+ |

Example 8 is representative of prior art metal-free magnesite-carbon brick while Example 10 is representative of a typical aluminum-containing magnesite-carbon brick. The brick of Example 9 was made with high purity graphite having a loss on ignition (LOI) of 99%. These data illustrate that a substantial increase in the crushing strength at 2800° F. resulted when the high purity flake graphite was used. Though not as strong as the aluminum metal-containing brick of Example 10, the brick of Example 9 is more refractory and would be expected to have a greater resistance to slag attack then the aluminum-containing brick.

EXAMPLES 11 to 19

A series of experiments were also conducted to determine what type of magnesite would be appropriate for use in metal-free brick that were to be applied in basic oxygen furnaces. This was important because at the high temperatures at which basic oxygen furnaces often operate (>3000° F.) the magnesite in the magnesite-carbon brick can react with the carbon in the brick in the following manner:

$$MgO + C \rightarrow CO_{(gas)} + Mg_{(gas)}$$

Reduction of magnesia (magnesite) by this mechanism would be expected to lower the hot strength of a magnesite-carbon brick.

In the tests, 80% −20+28 mesh magnesites of various chemistries were mixed with 20% carbon black and a plus addition of a phenolic resin binder. The resulting mixture was pressed into pellets and baked at 350° F. to cure the resin. The pellets were then coked to convert the resin to carbon. The pellets were then heated to 2920° F. in an argon atmosphere and measured for weight loss. The amount of weight loss was taken as a measure of the stability of the magnesite grain in the presence of carbon. The compositions and results are set forth in Table IV. The results are also depicted graphically in FIGS. 1 and 2.

TABLE IV

| | Example Number | | | | | | | | |
|---|---|---|---|---|---|---|---|---|---|
| | 11 | 12 | 13 | 14 | 15 | 16 | 17 | 18 | 19 |
| Mix (in wt. %): | | | | | | | | | |
| Magnesite A | 80% | | | | | | | | |
| Magnesite B | | 80% | | | | | | | |
| Magnesite C | | | 80% | | | | | | |
| Magnesite D | | | | 80% | | | | | |
| Magnesite E | | | | | 80% | | | | |
| Magnesite F | | | | | | 80% | | | |
| Magnesite G | | | | | | | 80% | | |
| Magnesite H | | | | | | | | 80% | |

TABLE IV-continued

|  | Example Number | | | | | | | | |
|---|---|---|---|---|---|---|---|---|---|
|  | 11 | 12 | 13 | 14 | 15 | 16 | 17 | 18 | 19 |
| Magnesite I |  |  |  |  |  |  |  |  | 80% |
| Carbon Black | 20 | 20 | 20 | 20 | 20 | 20 | 20 | 20 | 20 |
| Plus Addition: |  |  |  |  |  |  |  |  |  |
| Phenolic Resin | 3 | 3 | 3 | 3 | 3 | 3 | 3 | 3 | 3 |
| Isopropyl Alcohol | 5 | 5 | 5 | 5 | 5 | 5 | 5 | 5 | 5 |
| Weight Loss at 2920° F., in an Argon Atmosphere: | 9.3 | 6.1 | 11.2 | 8.1 | 10.1 | 16.7 | 23.4 | 8.7 | 15.6 |

TABLE IV

Chemistries of Magnesite Grains

| | Magnesite Type | | | | | | | | |
|---|---|---|---|---|---|---|---|---|---|
| | A | B | C | D | E | F | G | H | I |
| Chemical Analysis (Calcined Basis) | | | | | | | | | |
| Silica ($SiO_2$) | 0.82% | 0.07% | 0.29% | 0.18% | 0.82% | 0.19% | 0.20% | 0.29% | 0.70% |
| Alumina ($Al_2O_3$) | 0.16 | 0.10 | 0.15 | 0.09 | 0.16 | 0.06 | 0.07 | 0.09 | 0.20 |
| Titania ($TiO_2$) | <0.01 | <0.01 | 0.01 | 0.01 | <0.01 | <0.01 | <0.01 | <0.01 | — |
| Iron Oxide ($Fe_2O_3$) | 0.13 | 0.10 | 0.23 | 0.37 | 0.13 | 0.05 | 0.07 | 0.18 | 0.20 |
| Chromic Oxide ($Cr_2O_3$) | <0.02 | 0.08 | 0.02 | <0.02 | <0.02 | <0.01 | <0.01 | 0.21 | — |
| Lime (CaO) | 2.30 | 0.54 | 0.49 | 0.60 | 2.30 | 1.40 | 1.51 | 1.23 | 0.60 |
| Boron Oxide ($B_2O_3$) | 0.024 | <0.005 | 0.008 | 0.020 | 0.024 | 0.13 | 0.16 | — | — |
| Total Analyzed | 3.4 | 0.9 | 1.2 | 1.3 | 3.4 | 1.9 | 2.1 | 2.0 | 1.8 |
| By Difference Magnesia (MgO) | 96.6 | 99.1 | 98.8 | 98.7 | 96.6 | 98.1 | 97.9 | 98.0 | 98.2 |
| Total | 100.0% | 100.0% | 100.0% | 100.0% | 100.0% | 100.0% | 100.0% | 100.0% | 100.0% |

Comparison of Examples 11 and 12, for example, shows that generally higher purity magnesites were more stable than lower purity magnesites against reduction by carbon at high temperatures. However, the data also illustrated that purity level by itself did not dictate the stability of the magnesite grain in the presence of carbon. For example, Example 13 contained a relatively pure magnesite, but it still had a relatively high weight loss of 11.2%. This was attributed to Example 13 containing a magnesite with a relatively low lime-to-silica ratio. Thus, a high lime-to-silica ratio was desirable. In addition, Example 17 contained a magnesite of higher purity than that of Example 11. However, even though the magnesite of Example 17 had a high lime-to-silica ratio, Example 17 had a very high weight loss of 23.4%. This high weight loss was attributed to the magnesite of Example 17 having a high boron oxide content. Therefore, in addition to having high purity and a high lime-to-silica ratio, it was necessary for a magnesite grain to have a low boron oxide content in order to be stable in the presence of carbon at high temperatures.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A metal-free mix for forming a magnesite-carbon refractory shape comprising from about 70 to 92 wt. % of a high purity magnesite and, correspondingly, about 8 to 30 wt. % of a high purity graphite, and for each 100 wt. % of said magnesite and graphite from about 1.5 to 6 wt. % of a carbonaceous bonding agent; said magnesite containing at least about 98% MgO and containing less than about 0.03% boron oxide, less than about 0.3% silica, and having a $CaO/SiO_2$ weight ratio above about 2, and said graphite having a loss on ignition of at least about 98% and at least about 75% by weight −65 mesh or finer particles.

2. The mix of claim 1 wherein said magnesite contains at least 99% MgO and said carbonaceous bonding agent is a novolak resin, a resol resin, tar, pitch, or mixtures thereof.

3. The mix of claim 1 or 2 wherein said graphite is a flake graphite or a vein graphite.

4. A metal-free mix for forming a magnesite-carbon refractory consisting essentially of from about 70 to 92 wt. % of a high purity magnesite and about 8 to 30 wt. % of a high purity flake graphite or a vein graphite, and for each 100 wt. % of said magnesite and graphite from abut 1.5 to 6 wt. % of a carbonaceous bonding agent selected from novolak resins, resol resins, tar, pitch or mixtures thereof; said magnesite containing at least about 98% MgO and containing less than about 0.03% boron oxide, less than about 0.3% silica, and having a $CaO/SiO_2$ weight ratio above about 2, and said graphite having a loss on ignition of at least about 98% and at least about 75% by weight −65 mesh or finer particles.

5. A metal-free unburned magnesite-carbon refractory shape consisting of a baked mix comprising from about 70 to 92 wt. % of a high purity magnesite and, correspondingly, about 8 to 30 wt. % of a high purity graphite, and for each 100 wt. % of said magnesite and graphite, from about 1.5 to 6 wt. % of a carbonaceous bonding agent; said magnesite containing at least about 98% MgO and containing less than about 0.03% boron oxide, less than about 0.3% silica, and having a $CaO/SiO_2$ weight ratio above about 2, and said graphite having a loss on ignition of at least about 98% and at least about 75% by weight −65 mesh or finer particles.

6. The refractory shape of claim 5 wherein said shape is a brick and said magnesite contains at least 99% MgO.

7. The refractory shape of claim 5 wherein said graphite is a flake graphite or a vein graphite.

8. The refractory shape of claim 5, 6, or 7 wherein said carbonaceous bonding agent is a novolak resin, a resol resin, tar, pitch, or mixtures thereof.

9. A metal-free unburned refractory brick consisting essentially of a baked mix consisting essentially of from about 70 to 92 wt. % of a high purity magnesite and, correspondingly, about 8 to 30 wt. % of a high purity flake graphite or a vein graphite, and for each 100 wt. % of said magnesite and graphite, from about 1.5 to 6 wt. % of a carbonaceous bonding agent; said magnesite containing at least about 98% MgO and containing less than about 0.03% boron oxide, less than about 0.3% silica and having a $CaO/SiO_2$ weight ratio above about 2, and said graphite having a loss on ignition of at least about 98% and at least about 75% by weight −65 mesh or finer particles.

10. The refractory brick of claim 8 wherein said carbonaceous bonding agent is a novolak resin, a resol resin, tar, pitch, or mixtures thereof.

11. A refractory brick lining for metal processing equipment wherein a principal mode of wear of the lining is by slag attack comprising a plurality of unburned magnesite-carbon brick, said brick consisting essentially of a baked mix comprising from about 70 to 92 wt. % of a high purity magnesite and, correspondingly, about 8 to 30 wt. % of a high purity graphite, and for each 100 wt. % of said magnesite and graphite from about 1.5 to 6 wt. % of a carbonaceous bonding agent; said magnesite containing at least about 98% MgO and containing less than about 0.03% boron oxide, less than about 0.3% silica, and having a $CaO/SiO_2$ weight ratio above about 2, and said graphite having a loss on ignition of at least about 98% and at least about 75% by weight −65 mesh or finer particles.

12. The refractory brick liner of claim 11 for use in a basic oxygen furnace wherein the magnesite contains at least about 99% MgO and the graphite is a flake graphite or a vein graphite having at least about 95% by weight −65 mesh or finer particles.

13. The refractory brick liner of claim 11 or 12 wherein said carbonaceous bonding agent is a novolak resin, a resol resin, tar, pitch, or mixtures thereof.

14. The method of increasing the life of liners for metal processing equipment wherein a principal mode of wear of the lining is by slag attack comprising forming a lining in said equipment comprising a plurality of unburned magnesite-carbon brick and subsequently burning said brick; said unburned brick consisting essentially of baked mix comprising from about 70 to 92 wt. % of a high purity magnesite and, correspondingly, about 8 to 30 wt. % of a high purity graphite, and for each 100 wt. % of said magnesite and graphite from about 1.5 to 6 wt. % of a carbonaceous bonding agent; said magensite containing at least about 98% MgO and containing less than about 0.03% boron oxide, less than about 0.3% silica, and having a $CaO/SiO_2$ weight ratio above about 2, and said graphite having a loss of ignition of at least about 98% and at least about 75% by weight −65 mesh or finer particles.

15. The method of claim 14 for increasing the life of a liner for a basic oxygen furnace wherein the magnesite contains at least about 99% MgO and the graphite is a flake graphite or vein graphite having at least about 95% by weight −65 mesh or finer particles.

16. The method of claims 14 or 15 wherein said carbonaceous bonding agent is a novolak resin, a resol resin, tar, pitch, or mixtures thereof.

* * * * *